United States Patent [19]
Colistro

[11] Patent Number: 5,241,808
[45] Date of Patent: Sep. 7, 1993

[54] WING LIFTING MECHANISM FOR ROTARY MOWERS

[75] Inventor: Vincent A. Colistro, Humboldt, Canada

[73] Assignee: Schulte Industries Ltd., Englefeld, Canada

[21] Appl. No.: 866,352

[22] Filed: Apr. 10, 1992

[51] Int. Cl.⁵ .................. A01D 34/66; A01D 75/30
[52] U.S. Cl. ............................... 56/6; 56/15.2; 56/17.1
[58] Field of Search .................. 56/6, 13.5, 13.6, 15.2, 56/15.4, 17.1, DIG. 3, DIG. 10

[56] References Cited

U.S. PATENT DOCUMENTS

| | | | |
|---|---|---|---|
| 3,404,518 | 10/1968 | Kasper | 56/6 X |
| 3,897,832 | 8/1975 | Leedahl et al. | 56/6 X |
| 4,370,846 | 2/1983 | Arnold | 56/6 |
| 4,854,112 | 8/1989 | Holley et al. | 56/6 |
| 4,912,915 | 4/1990 | Smit | 56/13.6 X |
| 5,127,214 | 7/1992 | Colistro | 56/6 |

Primary Examiner—George A. Suchfield
Attorney, Agent, or Firm—Murray E. Thrift; Stanley G. Ade; Adrian D. Battison

[57] ABSTRACT

A rotary mower of the type used for mowing shallow angle furrows has a wing lift mechanism that will lift both wings simultaneously to a common height but permits both wings to follow the contours of the ground when the ground angle exceeds the preset angle of the mower.

15 Claims, 5 Drawing Sheets

WING LIFTING MECHANISM FOR ROTARY MOWERS

FIELD OF THE INVENTION

The present invention relates to mowers and more particularly to a mower intended for mowing shallow furrows of the type found in citrus groves.

BACKGROUND

A shallow furrow mower is described in the applicant's prior U.S. patent application Ser. No. 699962, now U.S. Pat. No. 5,127,514 filed May 14 1991, the disclosure of which is incorporated herein by reference. That earlier application is directed to an arrangement of blade sets in a mower of this type. The present invention relates to a wing lifting mechanism especially suited for use with such a mower.

SUMMARY

According to the present invention there is provided a mower comprising:
 a centre frame;
 two wings pivotally mounted on opposite sides of the centre frame for pivotal movement between respective lowered positions and raised positions;
 wing stop means mounted on the centre frame for limiting free travel of each wing to travel between the raised position and an intermediate position between the lowered position and the raised position; and
 stop adjustment means for adjusting the stop means to vary the intermediate position.

Preferably, the stop means and the stop adjustment means provide a lift mechanism for raising the wing to the raised positions for transport.

The lift mechanism preferably includes two lift arms mounted for independent pivotal movement on a common axis, and a rotor mounted between lift arms on the same axis. Two bearings projecting from the rotor engage seats on the respective arms when the rotor is rotated by a hydraulic cylinder to lift the arms to the raised positions. The wings are free to pivot independently upwardly beyond the position set by the lift mechanism. Consequently, the wings will follow the ground contours during mowing. At the end of a furrow, the operator may lift the entire mower using a main lift system. The wings are then raised with the centre frame and will maintain the angle set by the lift mechanism. A turn can thus be made without having the wings remain down to gouge into the ground.

BRIEF DESCRIPTION OF THE DRAWING

In the accompanying drawings, which illustrate an exemplary embodiment of the present invention.

DETAILED DESCRIPTION

Figure 1:
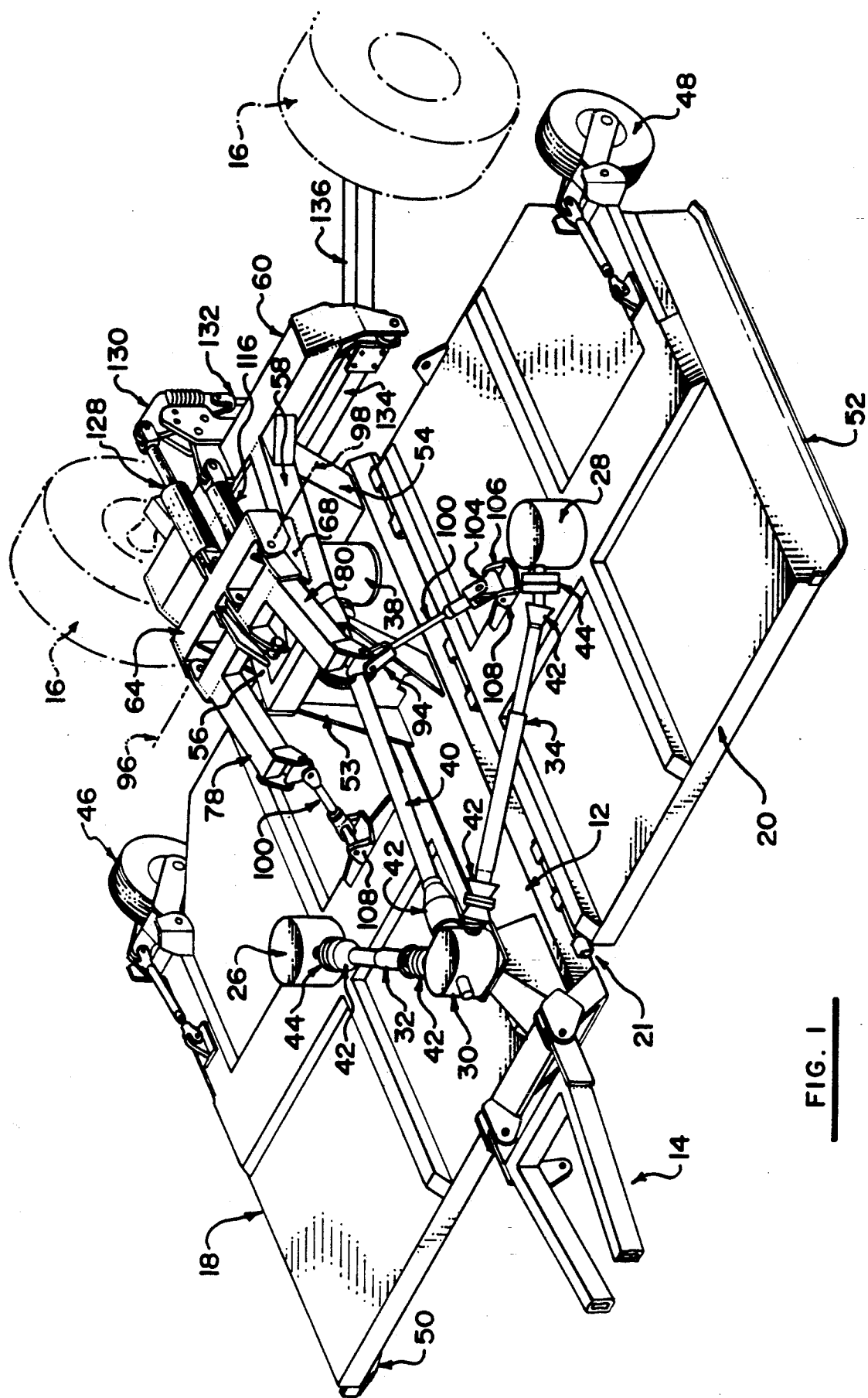
FIG. 1 is an isometric view of the apparatus with the wings lowered.
Figure 3:
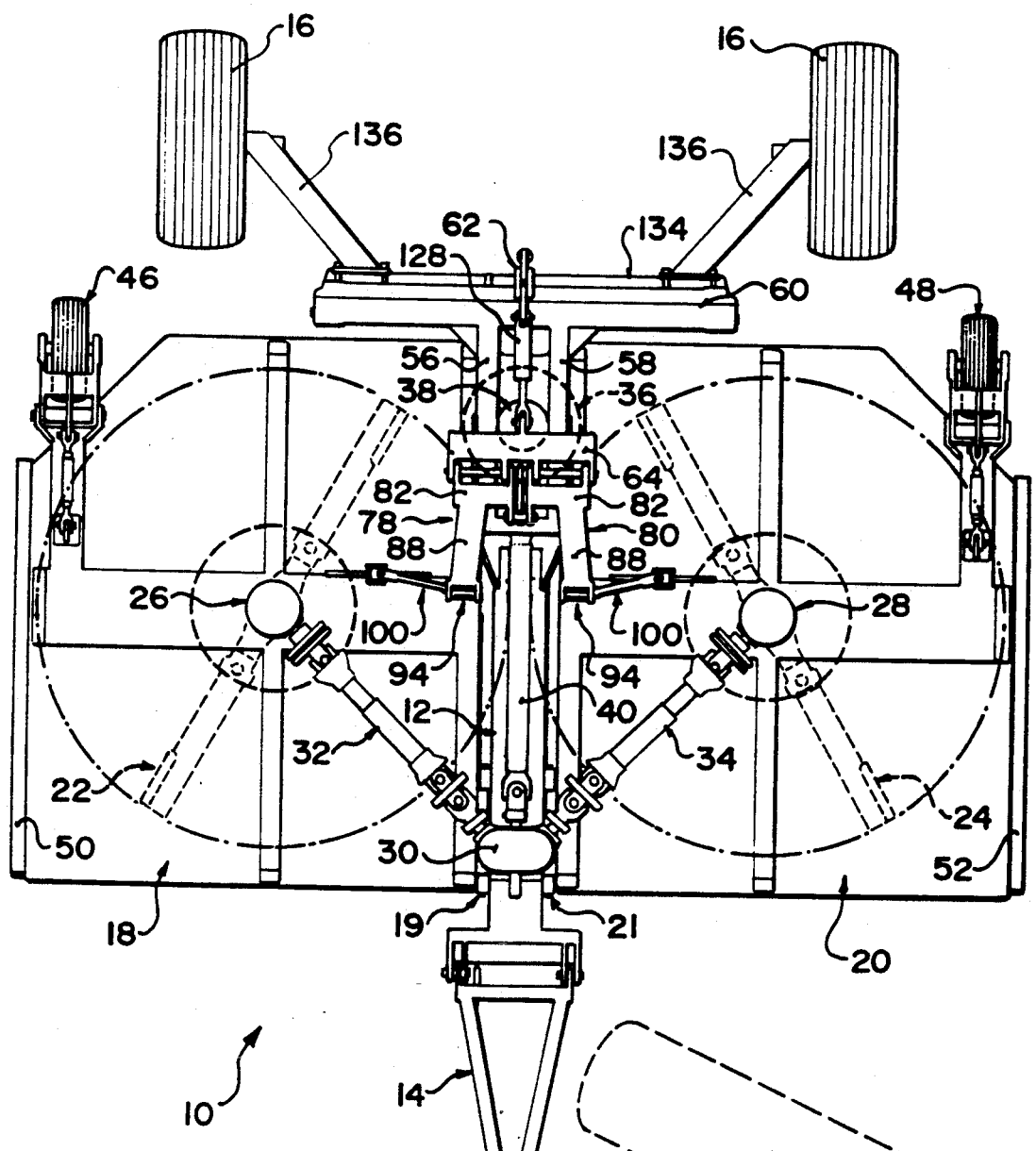
FIG. 3 is a plan view of the mower.
Figure 5:
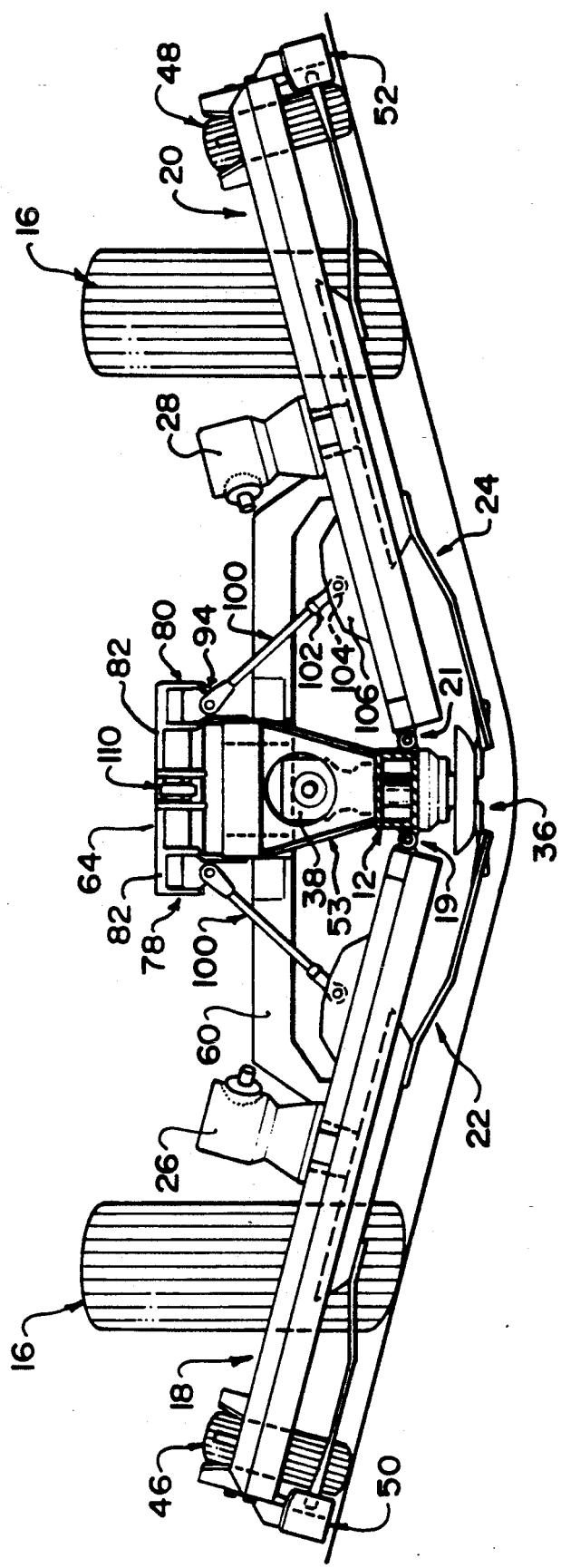
FIG. 5 is a front elevation of the mower.

Referring to the accompanying drawings and particularly to FIGS. 1, 3 and 5, there is illustrated a mower 10 with a narrow centre frame 12 connected at the leading end to a tongue 14 and at the trailing end to a support structure for two main support wheels 16. On opposite sides of the centre frame are two mower wings 18 and 20 pivotally mounted on the centre frame by hinges 19 FIGS. 3 and 21 respectively. The wings 18 and 20 carry blade sets 22 and 24 respectively. The blade sets are driven through gear boxes 26 and 28 respectively, both of which are driven by gear box 30 on the centre frame through drive shafts 32 and 34.

A third blade set 36 is located in the centre of the mower, behind the two main blade sets. It is driven by a gear box 38 itself driven by a shaft 40 from the gear box 30. Each of the shafts 32, 34 and 40 has a pair of universal joints 42 and a torque limiter 44 and each is telescopic to accommodate changes in the shaft length as the wings are raised and lowered.

Two wing support wheels 46 and 48 are mounted on the respective wings at the rear, outer corners. Skids 50 and 52 extend along the sides of the respective wings. The centre frame 12 of the mower carries two supports 53 and 54 near the back of the frame. These supports carry two laterally spaced beams 56 and 58. At the rear of the mower is a transverse wheel mounting beam 60 secured to the support 54 and the rear ends of the beams 56 and 58. The centre of the beam 60 carries a bracket 62 at the centre. Forwardly of the beam 60 is a crossbeam 64 supported above the beams 56 and 58 by a pair of supports 66 and 68 respectively.

Figure 2:
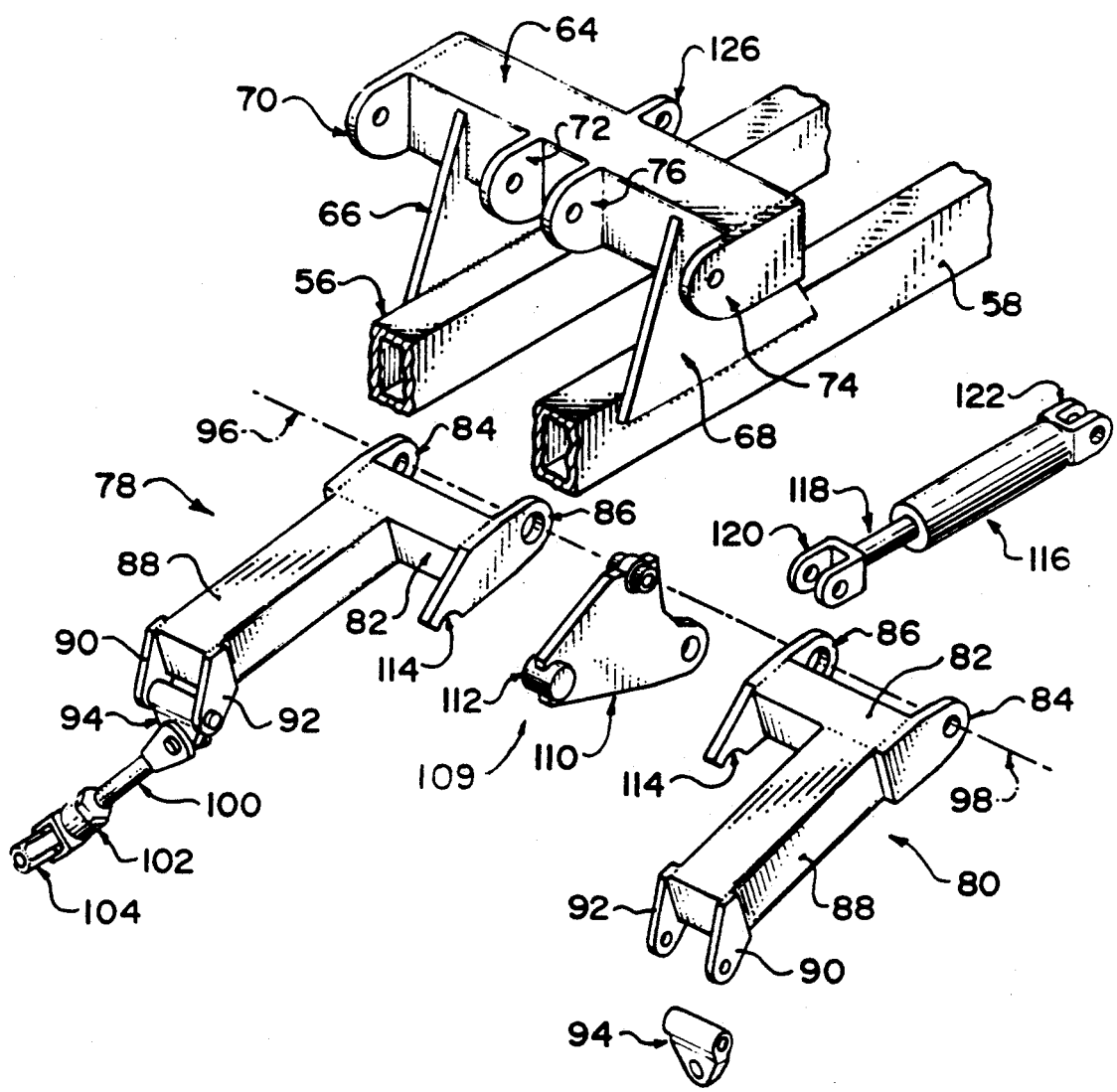
FIG. 2 is an exploded isometric of the lift mechanism.
Figure 2:
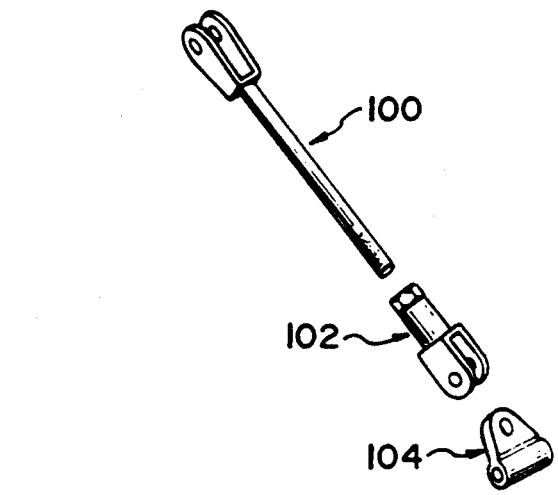

As shown most particularly in FIG. 2, the front side of the cross-beam 64 carries two pairs of lugs 70, 72 and 74, 76. These support two lift arms 78 and 80. Each lift arm has a transverse beam 82 extending between two lugs 84 and 86 and a forwardly extending arm 88. Two spaced lugs 90 and 92 project from the leading end of the arm 88 and carry a swivel joint 94 for purposes that will be described in the following.

The lift arm 78 has its lugs 84 and 86 pivotally connected to the lug 70 and 72 respectively for rotation about a horizontal, transverse axis 96. Similarly, the lift arm 80 has its lugs 84 and 86 pivotally connected to the lug 74 and 76 for pivotal movement of the arm about an axis 98 aligned with the axis 96.

A link 100 is connected to each of the swivel joints 94. It includes a length adjuster 102 and is connected at its opposite end to a swivel joint 104 which is, in turn, coupled to a pair of lugs 106, 108 upstanding from the top deck of one of the two mower wings 18 and 20.

Figure 4:
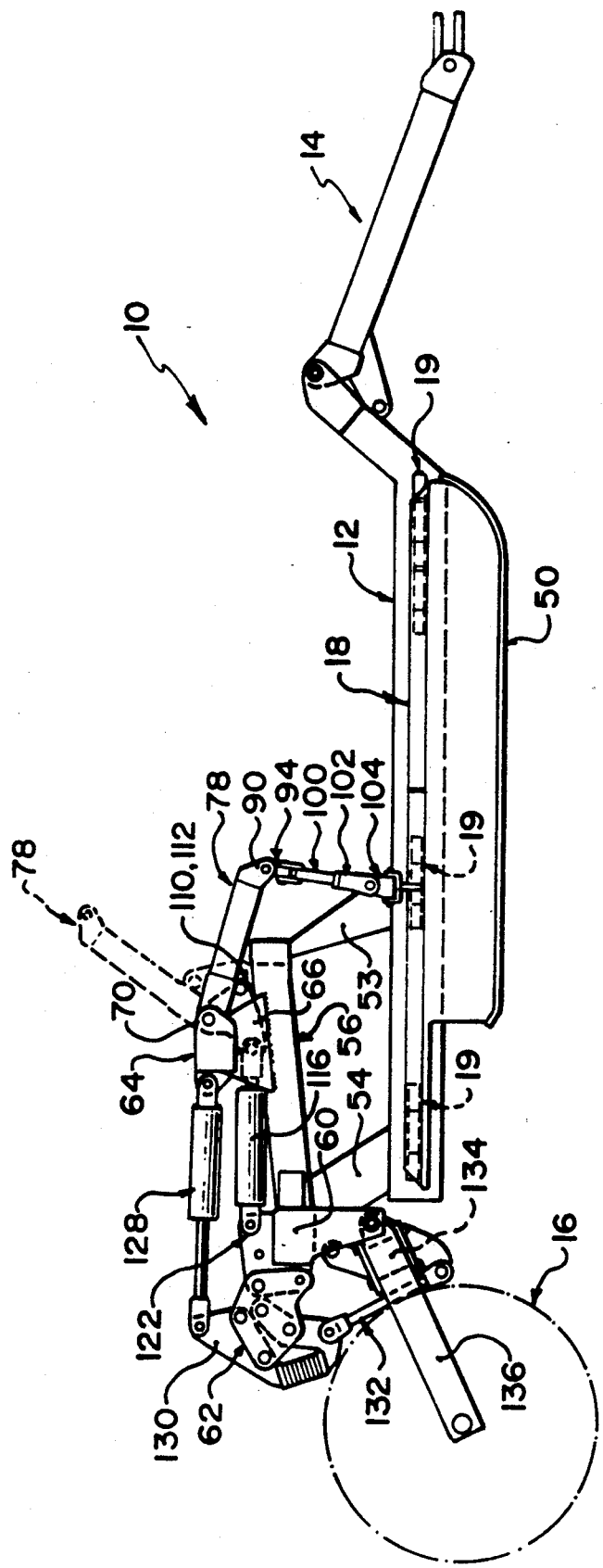
FIG. 4 is a side elevation of the mower.

Mounted on the front of the cross-beam 64 between the lift arms is a wing stop 109. The stop includes a rotor 110 pivotally mounted on the lug 72 and 74 for rotation about the same axis as the lift arms. At a leading end of the rotor are two bearings 112 projecting to opposite sides of the rotor. These engage in downwardly facing seats 114 formed in forward projections of the lift arm lugs 86. Behind the cross-beam 64 is a stop adjusting hydraulic cylinder 116 with its rod 118 connected to the rotor 110 by a clevis 120. This connection is below the axis 96, 98. The cylinder end of the cylinder 116 is connected by clevis 122 to the bracket 62 on the wheel mounting beam 60. Extension of the cylinder 116 will rotate the rotor in a sense to raise the bearings 112 against the seats 114, thus lifting the lift arms (see FIG. 4) and, through the links 100, the wings 18 and 20.

A depth control is associated with the cylinder 116 to limit the contraction of the cylinder and thus the downwards rotation of the rod 118. An operator may thus select a minimum lift condition for the wings, intermediate between the fully raised and fully lowered positions, which is particularly useful when turning.

A lug 126 on the back face of the cross-beam 64 is connected to the cylinder end of a second hydraulic cylinder 128. The rod end of that cylinder is connected to a lever 130 pivotally mounted on the bracket 62. Contraction of the cylinder 128 pivots the lever upwardly at the rear to pull on a link 132 that in turn pivots a transverse wheel beam 134 mounted on the wheel mounting beam 60 to pivot the wheel carrying struts 136 upwardly or downwardly as the case may be to raise or lower the entire mower on the main support wheels 16. The main lift cylinder 128 may thus control the overall height of the mower, including the wings, allowing the mower to be raised for transport purposes. When in use, the depth control will be set so that the wing angle will be slightly less than any wing angle anticipated to be used during mowing. Consequently, the wing support wheels 46 and 48 or the skids 50, 51, will cause the wings to follow the ground contours during mowing regardless of the setting of the wing lift mechanism because the wing lift arms 78 and 80 may lift off the rotor bearings 112.

While one embodiment of the invention has been described in the foregoing, it is to be understood that other embodiments are possible within the scope of the invention and are intended to be included within the scope of this invention. The invention is to be considered limited solely by the scope of the appended claims.

I claim:

1. A mower comprising:
    a centre frame;
    two wings pivotally mounted on opposite sides of the centre frame for pivotal movement between respective lowered positions and raised positions;
    lift means for moving the wings to the raised positions, including:
        wing stop means mounted on the centre frame for limiting the free travel of each wing to travel between the raised position and an intermediate position between lowered position and the raised position;
        independent lift linkages connected to the two wings and engageable with the stop means, each lift linkage comprising a lift arm and arm pivot means mounting the lift arm for pivotal movement about an arm axis; and
    bearing means and means for moving the bearing means into engagement with the lift arm so as to pivot the lift arms about the arm axes; and
    stop adjustment means for adjusting the stop means to vary the intermediate position.

2. A mower according to claim 1 wherein the lift arm axes are aligned and the lift means comprise a rotor mounted for rotation about the lift arm axis.

3. A mower according to claim 2 wherein each of the lift linkages comprises a link, connected to a respective lift arm and a respective wing.

4. A mower according to claim 3 wherein each link comprises swivel joints coupling the link to the respective lift arm and wing.

5. A mower comprising a centre frame, two wings pivotally mounted on opposite sides of the centre frame, mowing blade sets mounted on the wings and wing raising means mounted on the centre frame and connected to the wings for raising the wings from lowered positions projecting laterally from the centre frame to raised positions projecting upwardly from the centre frame, the wing lift means comprising two independent lift linkages coupled to respective ones of the wings, a single lift means for actuating the linkages to raise the wings simultaneously towards the raised positions and means for disengaging the lift means independently from each lift linkage in response to lifting of the wing towards the raised position independently of operation of the lift means.

6. A mower according to claim 5 including ground engaging support means mounted on each wing for supporting the wing on the ground.

7. A mower according to claim 6 wherein the ground engaging support means comprise skids.

8. A mower according to claim 6 wherein the ground engaging support means comprise wheels.

9. A mower according to claim 6 including main lift means mounted on the centre frame comprising ground engaging wheels and a means for raising and lowering the centre frame on the wheels.

10. A mower according to claim 5 wherein the wing raising means comprise two lift arms mounted for independent rotation about a common axis, a rotor located between the lift arms and mounted for rotation about said axis, bearing means carried by the rotor and engageable with the lift arms upon rotation of the rotor.

11. A mower according to claim 10 including link means coupled to each lift arm and a respective one of the wings.

12. A mower according to claim 16 wherein each link means comprises swivel joints adjacent each end thereof.

13. A mower according to claim 11 wherein the lift means comprise an hydraulic cylinder mounted on the centre frame and connected to the rotor for rotating the rotor.

14. A mower according to claim 5 including stop means for limiting the travel of the lift means away from the raised position.

15. A mower according to claim 14 wherein the stop means are operatively associated with the hydraulic cylinder.

* * * * *